March 5, 1935. G. MAIURI 1,993,518
REFRIGERATING MACHINE
Filed April 17, 1934
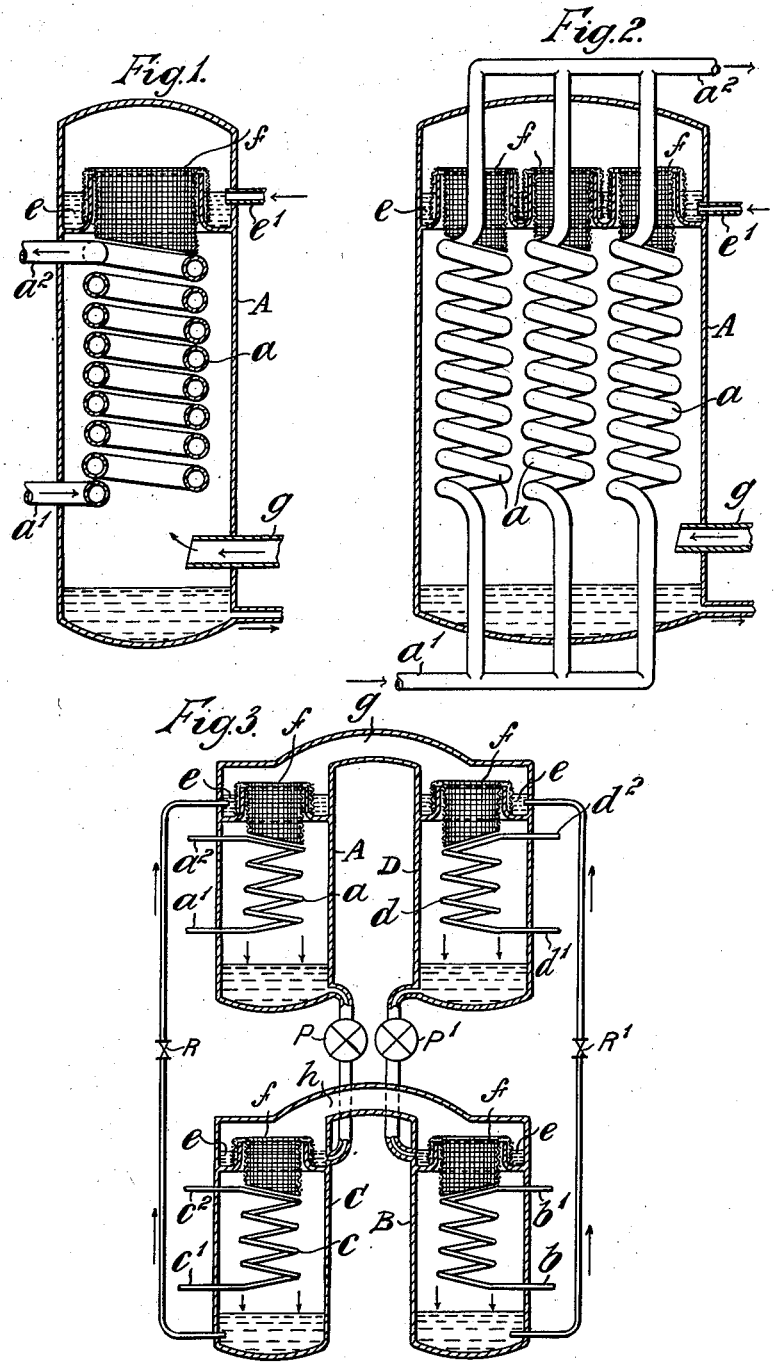
INVENTOR
GUIDO MAIURI
BY: Francis E. Boyce
ATTORNEY Patented Mar. 5, 1935

1,993,518

UNITED STATES PATENT OFFICE 1,993,518

REFRIGERATING MACHINE

Guido Maiuri, Aldwych, London, England, assignor to Maiuri Refrigeration Patents Limited, Aldwych, London, England Application April 17, 1934, Serial No. 720,977
In Belgium June 9, 1933

3 Claims. (Cl. 62—118)

This invention relates to refrigerating machines and mainly but not exclusively to absorption refrigerating machines, and its object is to improve such machines by enabling the transmission of heat from and to small volumes of liquid in the absorbers, resorbers, evaporators and generators thereof, to be efficiently effected.

In absorption or resorption refrigerating machines, one of the most important parts is the absorber. The liquid absorption medium such as water or weak ammonia liquor, in absorbing the refrigerant vapour such as ammonia, becomes heated, and it is necessary to remove this latent heat of absorption, by transmitting the heat to circulating cooling water. The conditions to be fulfilled in order to have a good absorber are ample contact surface between the weak ammonia liquor and the ammonia vapours to be absorbed and ample transmission of heat between the said ammonia liquor and the circulating cooling water.

One of the most efficient types of absorber is the dripping type wherein the weak ammonia liquor flows over the surface of pipes traversed by the cooling water, the whole being enclosed in a closed vessel into which the ammonia vapour derived from the evaporator, is drawn. This type of absorber operates effectively when the quantity of ammonia liquor in circulation is sufficient to be so distributed as to drip in such manner as completely to moisten all the surface of the pipes. On the contrary, when the quantity of ammonia liquor is small, which happens in most cases, it is extremely difficult to have good distribution and to obtain good absorption.

The present invention enables this difficulty to be completely solved and enables very efficient absorbers to be constructed, even in the case where the very small quantity of ammonia liquor circulating would cause the employment of an ordinary dripping absorber to be impossible. The invention therefore enables simple or compound absorption machines to be produced for obtaining very low temperatures, such as —65° or —70° C., since in such case the evaporation must occur under a pressure of 75 m/m to 60 m/m of mercury (i. e. a vacuum of 685 to 700 m/m of mercury), and that under such conditions it is impossible to employ submerged types of absorbers which would cause an inadmissible loss of subatmospheric pressure. The dripping type of absorber alone enables by its absolute lack of loss of pressure, such extreme vacuums to be reached in the evaporator, but in order to be efficient it is necessary that all the surface of the tubes be wetted, notwithstanding the small quantity of liquid available for distribution thereto.

The same desirability, although possibly not so urgent, of thoroughly wetting the heat transmitting surfaces notwithstanding the possibly small quantity of liquid available therefor, is also present in the evaporators of absorption and other refrigerating machines and the generators of absorption refrigerating machines and the present invention is applicable also to these portions of such machines.

For the above purpose, according to the invention, in the absorber, resorber, evaporator or generator of a refrigerating machine, liquid is distributed equally on to a heat-transmitting surface by means of a wick dipping into the liquid and dripping the liquid on to the heat-transmitting surface.

The wick dips into a gallery or trough into which the liquid is supplied within the absorber, resorber, evaporator or generator as the case may be, and the wick hangs over the upstanding flange forming a weir of the gallery or trough. The overhanging portion of the wick depends above the heat-transmitting surface, which is the surface of a coil of piping traversed by cooling water, liquid to be refrigerated, or steam for heating as the case may be.

The invention and a resorption refrigerating machine embodying the invention in its several components, are illustrated somewhat diagrammatically, by way of example on the accompanying drawing, in which:—

Fig. 1 is a vertical section of an absorber, and Fig. 2 is a vertical section of a modified construction of absorber.

Fig. 3 is a diagrammatic representation in sectional elevation of a resorption refrigerating machine embodying the invention.

The absorber shown in Fig. 1 consists of a cylindrical vessel A in which is located a helically coiled pipe $a$, arranged with the axis of the coil upright, internally traversed by cooling water, which enters at $a'$ and issues at $a^2$. Within the vessel A at its upper end, above the coil, there is an annular gallery $e$ the flange of which forms a weir and constitutes the distributer of the weak ammonia liquor which is dripped on to the coil $a$.

Straddling the border of the weir is a double metal gauze $f$, which on one side dips to the bottom of the trough $e$ and on the other side extends to just above the pipe coil $a$ and approximately concentric therewith, almost touching the topmost convolution thereof.

The gauze, $f$, which is sufficiently robust to preclude any destruction by corrosion, is double (two gauzes superposed) so that once it is primed it acts as a wick. At the start the weak liquor arriving at $e'$ eventually fills the whole gallery $e$ and overflows the weir flange thereof, whereby the wick becomes primed and sucks up the liquid from the gallery $e$ like a siphon and distributes it uniformly on to the coil $a$. The level of the liquid in the gallery $e$ sinks until the quantity of the liquid sucked up by capillarity by the metal wick equals the quantity of liquid admitted at $e'$.

Experience has shown that, even with an admission of 0.5 litre per hour of liquid per centimetre run of the gallery $e$, the apparatus operates well and the coil $a$ is completely wetted over all its surface, whereas an ordinary dripping condenser would have to receive at least 10 times this quantity of liquid in order to operate efficiently.

The gaseous ammonia to be absorbed enters the vessel A at the bottom at $g$ but may equally well be admitted at the top. The enriched liquor accumulates in the bottom of the vessel A and is drawn off by the usual circulation pump.

Fig. 2 shows the same arrangement of absorber but with a number of coils $a$, seven coils in the construction illustrated of which only three are visible in the vertical section shown. The several parts are denoted by the same reference letters as in Fig. 1. The gallery $e$ however has seven weir flanges, of which only three are visible in the section, concentric with the coils $a$. Each weir is straddled by a double metal gauze wick $f$. The operation is as described above.

An apparatus comprising coils of cylindrical shape has been described above, but the arrangement according to the invention is equally applicable when the cooling tubes are arranged in vertical rows instead of being in the form of coils. The distribution galleries are in such case straight and the wicks extend to the upper tubes of the vertical rows.

Wicks formed by two metal gauzes juxtaposed have been spoken of, but other materials may also be employed, for example, hempen cloth which resists ammonia liquor almost indefinitely.

The apparatus described above acts as an absorber, but may likewise be employed as an evaporator to cool brine by evaporating liquid ammonia dripping on the coil traversed by the brine. It may also be used as a resorber of a resorption machine, and also as the generator of an absorption or resorption machine. A resorption refrigerating machine may be constituted by four of the above described apparatuses according to the invention.

Fig. 3 shows the diagram of such a resorption refrigerating machine, intended to cool water or brine, and utilizing waste heat, such as heat contained in the exhaust steam or the hot water derived from economizers of steam boilers. This refrigerating machine is composed of four identical or almost identical apparatuses constructed as above described. A is the absorber cooled by the circulation of water $a'$—$a$—$a^2$. The rich liquid which accumulates in the bottom of the vessel A is sucked by a pump P and delivered to the wick-provided gallery $e$, $f$ of a generator C wherein it drips on to a coil $c'$—$c$—$c^2$, in which steam or hot water circulates. The rich ammonia liquor becomes heated and disengages ammonia. The weak liquor passes by an expansion valve R and returns to the absorber A. The ammonia vapour disengaged in the generator C passes by a passage $h$ to a vessel B which is the resorber, wherein it is absorbed by ammonia liquor dripping from the wick-provided gallery $e$, $f$, therein, firming a very concentrated solution, which passing an expansion valve R' arrives at the wick-provided gallery $e$—$f$ of a vessel D, which is the evaporator. This very rich solution is by the wick caused to drip on to a coil $d'$—$d$—$d^2$ in which circulates the water or the brine to be cooled, the ammonia evaporates producing cold and the ammonia vapours pass to and are absorbed in the vessel A. The impoverished liquor is taken by a pump P' and delivered into the resorber B. A water circulation coil $b$—$b'$—$b^2$ removes the heat due to the absorption from the liquor dripping thereon from the wick $f$ in the resorber B.

Instead of two pumps, only one may sometimes be provided, the two liquids mixing.

Heat exchangers and such like recuperators capable of transforming the above described machine into an absorption machine, working with a reversible heat cycle as set forth a long time ago by Altenkirch, have not been described. As all transmissions of heat in this machine are effected at varying temperature, the apparatus according to the present invention lends itself readily to recuperation of heat. For example, the rich liquid taken by the pump P from the bottom of the absorber A can be led back into the upper portion of such absorber A in a coil replacing the upper convolutions of the coil $a'$—$a$—$a^2$, which latter would thus be divided into two superposed separate portions, in such manner as to heat the rich liquor with the heat of absorption. The weak liquid from the boiler C may also pass into a coil replacing the upper convolutions of the coil $c'$—$c$—$c^2$ in such manner as to become heated before arriving at the absorber A wherein the absorption can be initiated at elevated temperature, in certain cases above the temperature of ebullition of the rich liquor. Similar recuperations of heat may take place in D and B, in certain cases. This arrangement enables profiting by all the advantages of the cycles set forth by Altenkirch and obtaining machines having a heat ratio equal or superior to unity.

The machine described is very suitable for cooling by about a dozen degrees water passing to the moulds of the freezer of an ice factory. Such refrigeration can be effected by employing in the coil $c'$—$c$—$c^2$ hot water derived from economizers of the steam boiler. This hot water becomes cooled several degrees and is sent back to the economizers. However as the water circulating in $b'$—$b$—$b^2$ and $a'$—$a$—$a^2$ may be considerably heated, the economizers may be supplied with this heated water and thus recuperate a large part of the heat. Under these conditions, the refrigeration of the water can be effected under extremely advantageous conditions and a considerable increase in the production of ice obtained.

The arrangement according to the invention can likewise be utilized with success in machines containing an inert gas for completely or partially equalizing the pressures. In such case, baffles are provided in the space enclosed by the coils, which oblige the gaseous mixture circulating with the ammonia vapour to pass in contact with the coil wetted with the ammonia liquor.

In the resorption machine described with reference to Fig. 3, the inert gas may be employed to equalize the pressures in the vessels C and B and in A and D, by establishing between the respective two vessels a second communication which enables a circulation by known methods of the inert gas between the two vessels. In such case, the inert gas may be employed to reduce the difference of pressure without always equalizing it.

In machines of small dimensions, with uniform pressure and without moving parts, the described form of absorber, evaporator or resorber can give considerable advantages because of the small resistance opposed to the passage of the inert gas, and the great power of absorption.

In the above description, ammonia has been selected as the refrigerant liquid and water as the absorbent, but the invention can be carried out with all its advantages when any liquid mixture having similar properties is used, for example, dichlorethylene and paraffin oil, ethyl chloride and "fusel oil" etc.

I claim:

1. In a refrigerating machine, a vessel, vertically superposed piping in said vessel, a weir in said vessel above said piping, means supplying liquid to said weir and a wick dipping into said liquid and depending directly above said piping.

2. In a refrigerating machine, a vessel, a helically coiled pipe located with the axis of the coil upright in said vessel, a balcony in said vessel having an upstanding flange above said coiled pipe, means supplying liquid to said balcony, and a wick dipping into said liquid and straddling said flange and depending directly over said coiled pipe.

3. In a refrigerating machine, a vessel, a plurality of helically coiled pipes located with the axes of the coils upright in said vessel, a balcony in said vessel having upstanding flanges above said coiled pipes, means supplying liquid to said balcony, and wicks dipping into said liquid and straddling said flanges and depending directly over said coiled pipes.

GUIDO MAIURI.